US006922759B1

(12) United States Patent
Garritsen

(10) Patent No.: US 6,922,759 B1
(45) Date of Patent: Jul. 26, 2005

(54) METHOD, SYSTEM AND APPARATUS FOR PLAYING SONGS DIRECTLY FROM A HARD DRIVE

(75) Inventor: Frido Garritsen, Hayward, CA (US)

(73) Assignee: Silicon Motion, Inc., San Jose, CA (US)

( * ) Notice: Subject to any disclaimer, the term of this patent is extended or adjusted under 35 U.S.C. 154(b) by 670 days.

(21) Appl. No.: 09/975,464

(22) Filed: Oct. 4, 2001

(51) Int. Cl.$^7$ ............................................. G06F 13/12
(52) U.S. Cl. ...................................................... 711/154
(58) Field of Search ................................. 711/112, 154

(56) References Cited

U.S. PATENT DOCUMENTS 6,332,145 B1 * 12/2001 Kawasaki et al. ....... 707/104.1
6,691,130 B2 * 2/2004 Kawasaki et al. .......... 707/102

* cited by examiner

Primary Examiner—Kevin L. Ellis
(74) Attorney, Agent, or Firm—Blakely, Sokoloff, Taylor & Zafman LLP

(57) ABSTRACT

In one embodiment, the invention is a method. The method includes receiving a request at a primary device to play an audio file, where the primary device is in a power saving state. The method also includes accessing a storage location on the primary device. The method further includes locating a play list which has a record of the audio file. Moreover, the method includes choosing the audio file from the play list and playing the audio file.

46 Claims, 8 Drawing Sheets

METHOD, SYSTEM AND APPARATUS FOR PLAYING SONGS DIRECTLY FROM A HARD DRIVE

FIELD OF THE INVENTION

The present invention relates generally to a file management system for a computer or electronic device's storage medium, and in particular, to a file management system capable of utilization by a low powered audio device with limited resources while the computer or electronic device is in a power saving or un-powered state.

BACKGROUND

While a computer's hard drive may be used to load software onto a computer (e.g. notebook) it may also be used to play music through that same computer's speaker(s). In recent years the popularity of playing audio files (e.g. MP3 format for example) from a computer's hard drive has grown as the number of people with personal computers and notebook/laptop computers has increased dramatically.

However, in order to accomplish playing audio files from a hard drive it may be necessary to have special software (e.g. Windows media player ™ for example) installed on the computer. This software has traditionally been accessed by the computer system's processor. Therefore, it may be necessary for the computer to be powered and booted up so that the computer's processor can play an audio file from a hard drive. These requirements can waste time and power by requiring a system to be powered on, booted-up, and for the system to remain in this mode during the playing of audio files. The wasting of power is a more pronounced problem in a laptop computer which is running on a battery. All laptops use some type of rechargeable battery (lithium, nickel-cadmium, nickel-metal hydride).

The battery life varies depending on the type of rechargeable battery (lithium batteries tend to hold their charge longer) and how the computer is used (frequent use of disk drives consumes a lot of battery power). Also, it is important to note that an LCD flat panel used by a laptop or notebook computer consumes a significant amount of battery power. In addition to the main battery, laptops may have other batteries to run clocks and backup CMOS RAM.

In order to play audio files from a device's (e.g. notebook for example) hard drive while the device is in a power saving state (e.g. powered off, sleep mode, or suspend mode for example), a low power audio device incorporating a micro-controller (e.g. 8051 for example) may be useful. However, a standard file system (e.g. FAT32 used by DOS/Windows for example) is too complex to be handled by a small low power device such as a micro-controller (e.g. 8051 for example) with its limited resources. Jumping from song to song would take a long time (in the range of seconds) because the micro-controller needs to parse the entire file system to locate the next song. Also, song data (e.g. MP3 audio file for example) can be fragmented over a hard drive, adding more delays to playing back the data. The problem with using a low power device such as a micro-controller to play back files from a computer or audio jukebox physical storage medium (e.g. hard drive for example) is that the hard drives may be very large (e.g. frequently in excess of 10 GB for example) and they may contain thousands of files. A simple micro-controller is too slow and has too little processing resources to parse all that information.

Another problem with using a small low power device such as a micro-controller to handle a complex hard drive file system (e.g. FAT32 for example) is that a hard drive file system has a tendency to become very fragmented over time, especially when adding and removing a large number of files. This makes processing for the low power micro-controller even tougher, since now it needs to access data in a potential song all across the physical hard drive space. In addition to hard drive file systems such as FAT32 being very complex, there are a number of such file systems which the low power micro-controller may encounter on a PC (e.g. FAT12, FAT16, FAT32, FAT32X, NTFS, Linux, etc.), and therefore needs to understand and parse.

The above issues combined make it currently very difficult to write an embedded application in which a low powered microcontroller can be used to parse a hard drive file system and play back songs when the system in which the hard drive resides is turned off. What is needed is a new file system tailored towards a low powered micro-controller (e.g. 8051 for example). The file system should be simple so that the micro-controller can parse through it quickly.

A further goal in solving this problem would be to create a file system in which both the host operating system and a low powered micro-controller (e.g. 8051 for example) would have the ability to access the file system without too much overhead.

SUMMARY OF THE INVENTION

In one embodiment, the invention is a method. The method includes receiving a request at a primary device to play an audio file, where the primary device is in a power saving state. The method also includes accessing a storage location on the primary device. The method further includes locating a play list which has a record of the audio file. Moreover, the method includes choosing the audio file from the play list and playing the audio file.

In an alternate embodiment, the invention is also a method. The method includes powering on a primary device. The method also includes choosing a file to save to a storage location on the device. The method further includes locating the storage location on the primary device. In addition, the method includes locating a list of audio files which have been saved to the storage location. Moreover, the method includes determining where to store the file; writing the file to the storage location. Furthermore, the method includes writing information related to the file to a record.

In another alternate embodiment, the invention is an apparatus. The apparatus includes a file system management logic block for a physical storage location. The apparatus also includes a volume management logic block for the physical storage location. The apparatus further includes a file management logic block for the physical storage location. Moreover, the apparatus includes a song play list management logic block for the physical storage location.

In another embodiment, the invention: is a machine readable medium. The machine readable medium includes a program for execution by a machine, the program comprising a first code block segment for mounting and dismounting a volume. The machine readable medium also includes a second code block for keeping track of where files are located on the volume. The machine readable medium further includes a third code block for managing files and directories on the volume. Moreover, the machine readable medium includes a fourth code block for managing and organizing a play list or multiple play lists on a volume, where a play list is a list of files.

BRIEF DESCRIPTION OF THE DRAWINGS

The present invention is illustrated by way of example and not limitation in the figures of the accompanying drawings, in which like references indicate similar elements, and in which:

FIG. 6 illustrates an alternate embodiment of the method provided in FIG. 4a.

DETAILED DESCRIPTION

Figure 1:
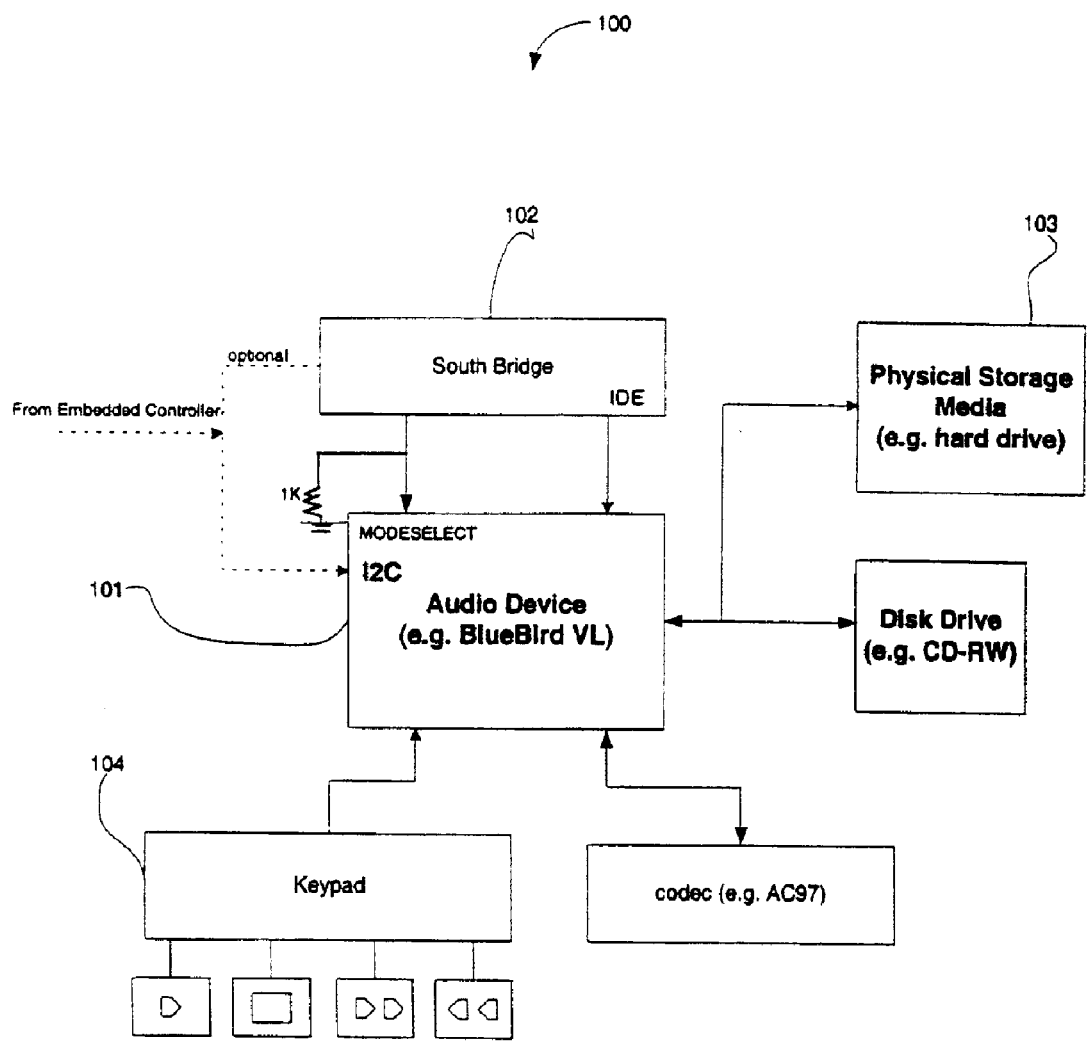
FIG. 1 illustrates an embodiment of a device for playing audio files in a power saving state attached to a computer.

Embodiments of the present invention (as described below as well as others) may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention, measured only in terms of the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Various embodiments disclosed provide methods and a file system architecture which may play audio files of multiple formats (e.g. MP3, WMA, WAV) from a computer's (e.g. notebook) physical storage medium (e.g. hard-drive), while the computer is in a power saving, mode (e.g. power off mode, suspend mode, sleep mode, or a similar power saving mode). In addition, the embodiments disclosed allow the computer with its resources to add, delete, and manage the audio files available.

The embodiment disclosed allows an audio device (e.g. CD-ROM including an 8051 micro-controller) having relatively few resources to access audio files on a computer's (e.g. notebook) physical storage medium (e.g. hard-drive) while the computer is in a power saving state. Furthermore, the audio files available to the device (e.g. micro-controller) in a power saving state may also be accessible to the computer's operating :system (e.g. windows, Linux, etc . . . ) while the computer is powered on.

In one embodiment, four layers make up the file system architecture. The four layers include a File System Management layer, a Volume Management layer, a File Management layer, and a Play List Management layer. The following briefly describes each layer.

The File system Management layer is the lowest layer of the file system architecture disclosed. It mounts and dismounts the volume, formats the volume on request, and controls how and when other layers may access the physical storage device.

The Volume Management layer is responsible for keeping track of where files are located on the volume. It is also responsible for keeping the volume defragmented.

The File Management layer is a higher abstraction of the Volume Management layer. It keeps track of directories and files. It allows for creating and deleting directories, reading and writing of files, and changing the attributes (e.g. file, date, access permissions) of files.

The Play List Management layer calls the Play List Management for each supported song format. In one embodiment, the Play List Management layer maintains two lists. First, the Play List Management has a Play List Index.

The Play List Index is a structure that defines all Play Lists stored within the file system architecture disclosed. Second, the Play List Management has a Current Play List. The Current Play List is a binary representation of a list of songs. It describes where the songs are located. The Current Play List is the entity of the file system that is used by the audio device to play audio files.

Referring to FIG. 1, an audio device 101 attached to a computer through the computer's south bridge 102 is provided. The audio device 101 is capable of playing audio files from a computer's physical storage medium (e.g. hard drive) 103 when the computer is in a power saving state (e.g. powered off, sleep mode, suspend mode, etc . . . ). The audio device 101 may be a BlueBird VL available from Silicon Motion. The BlueBird VL is a combination micro-controller (e.g. 8051) and Digital Signal Processor (DSP). The audio device 101 is a low powered device with limited resources. The file system architecture disclosed provides the audio device 101 with the ability to quickly locate a song on the physical storage medium and then play the song.

Figure 2:
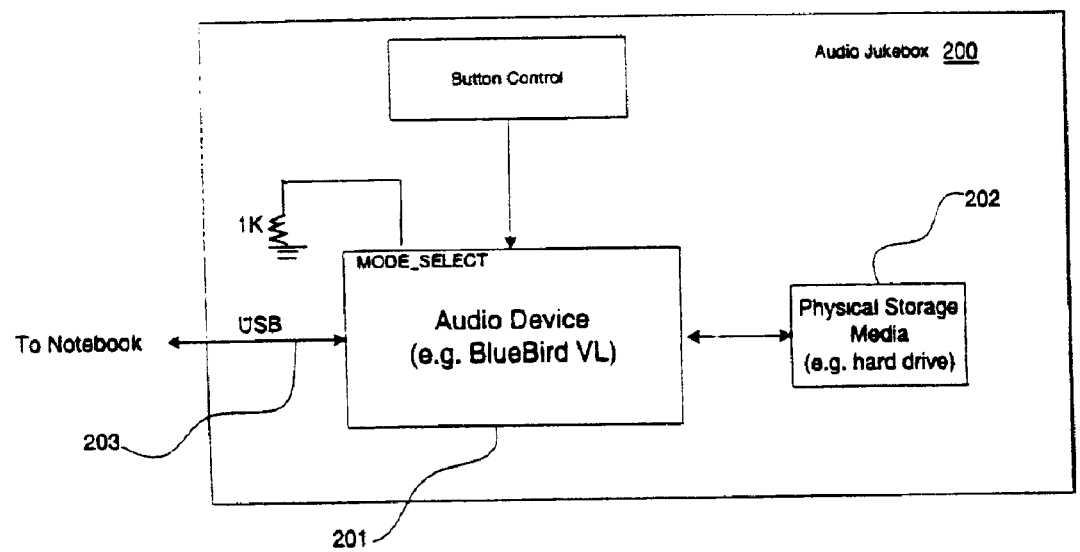
FIG. 2 illustrates an embodiment of a device for playing audio files attached to an audio jukebox.

Referring to FIG. 2, the audio device (e.g. BlueBird VL) 201 may reside in an audio jukebox 200. The audio device 201 is capable of playing audio files from the audio jukebox's physical storage medium (e.g. hard drive) 202. The audio jukebox 200 receives audio files from a host computer through a USB connection 203. Similar to the audio device 101 in FIG. 1, the file system architecture disclosed provides the audio device 201 of FIG. 2 with the ability to quickly locate a song on the physical storage medium (e.g. jukebox hard drive) 202 and then play the song.

Figure 3:
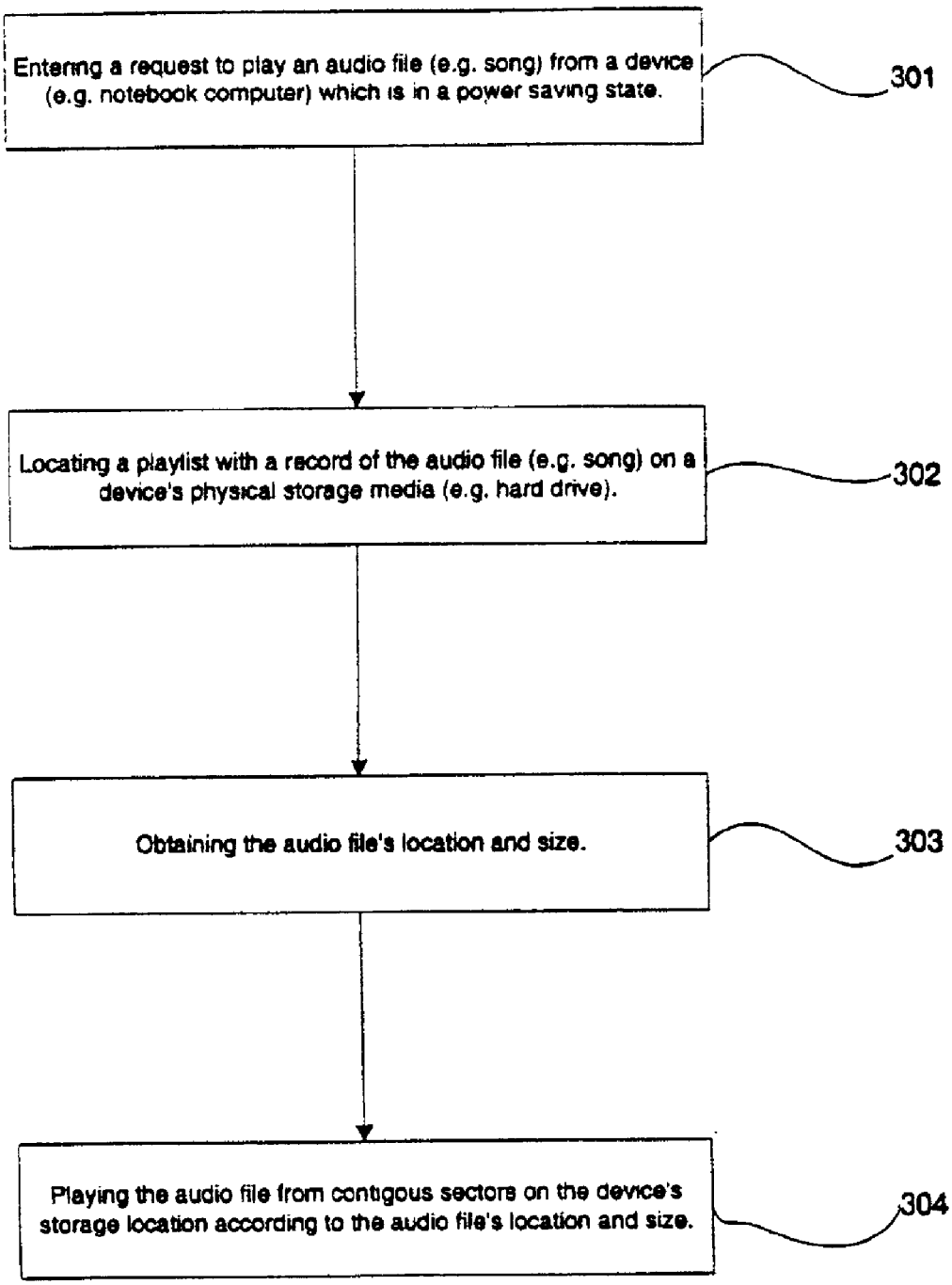
FIG. 3 illustrates an embodiment of a method for playing audio files from a device which is in a power saving state, utilizing an embodiment of the file system architecture disclosed.

FIG. 3 shows an embodiment of a method for playing audio files from a device (e.g. notebook computer) 300 in a power saving state, utilizing the file system architecture disclosed in combination with an audio device 301. Referring to FIGS. 1 and 3, the play process is initiated by the audio device 101 receiving 301 a user request (e.g. at an attached keypad 104) to play an audio file from a device (e.g. notebook computer) 100 which is in a power saving state (e.g. powered off, sleep mode, suspend mode, etc . . . ). After receiving the user's request, the audio device 101 then locates 302 a play list with a record of the audio file (e.g. song). The play list resides on the device's (e.g. notebook computer) 100 physical storage medium (e.g. hard drive) 103. After locating the play list, the audio device 101 obtains 303 the audio file's location on the physical storage medium 103 and the audio file's size. After obtaining the audio file's location and size, the audio device 101 plays 304 the audio file from contiguous, sectors on the device's (e.g. notebook computer) 100 physical storage medium (e.g. hard drive) 103 according to the audio file's location and size.

Figure 4A:
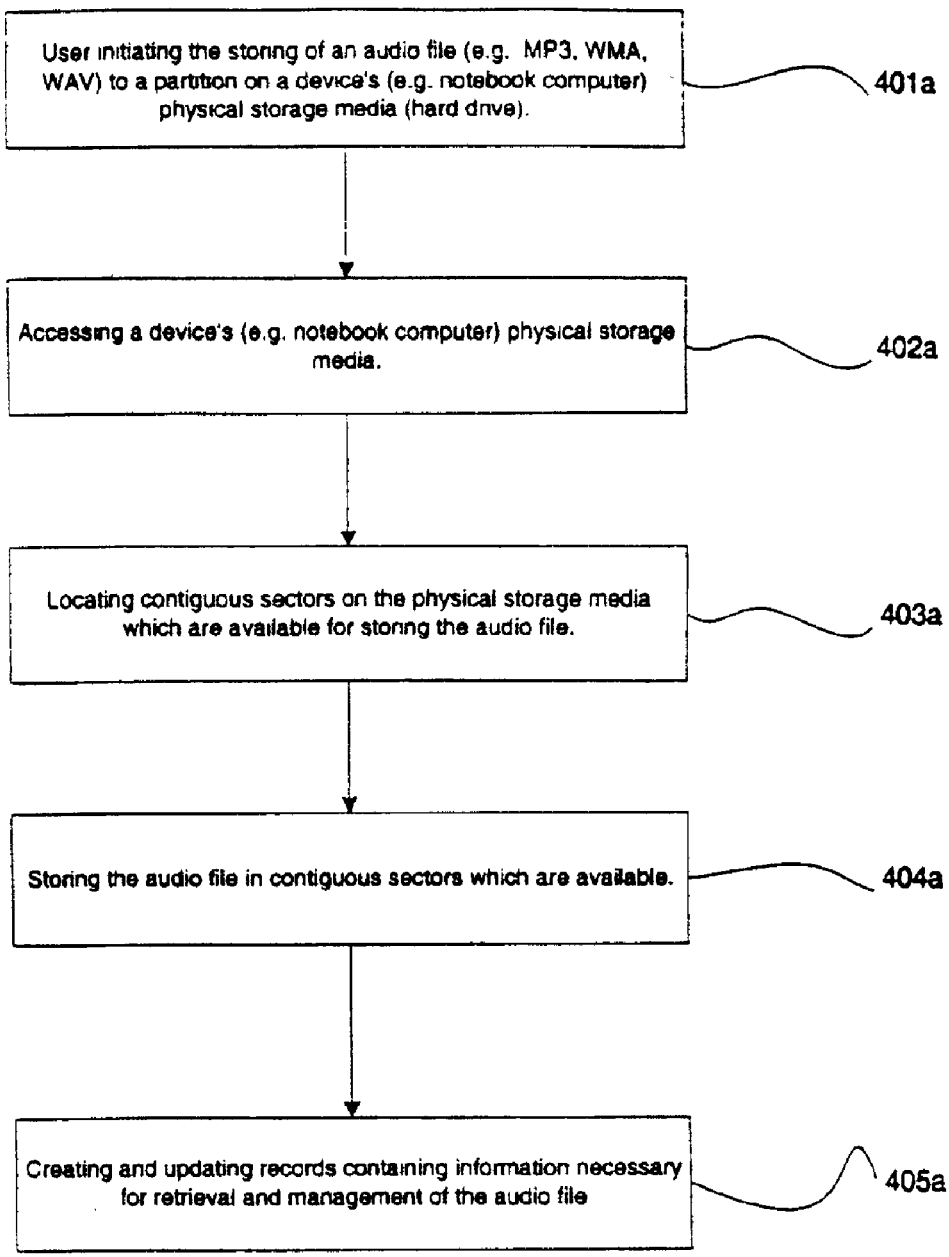
FIG. 4a illustrates an embodiment of a method for storing audio files to a partition of a physical storage medium which is managed by an embodiment of the file system architecture disclosed.
Figure 4B:
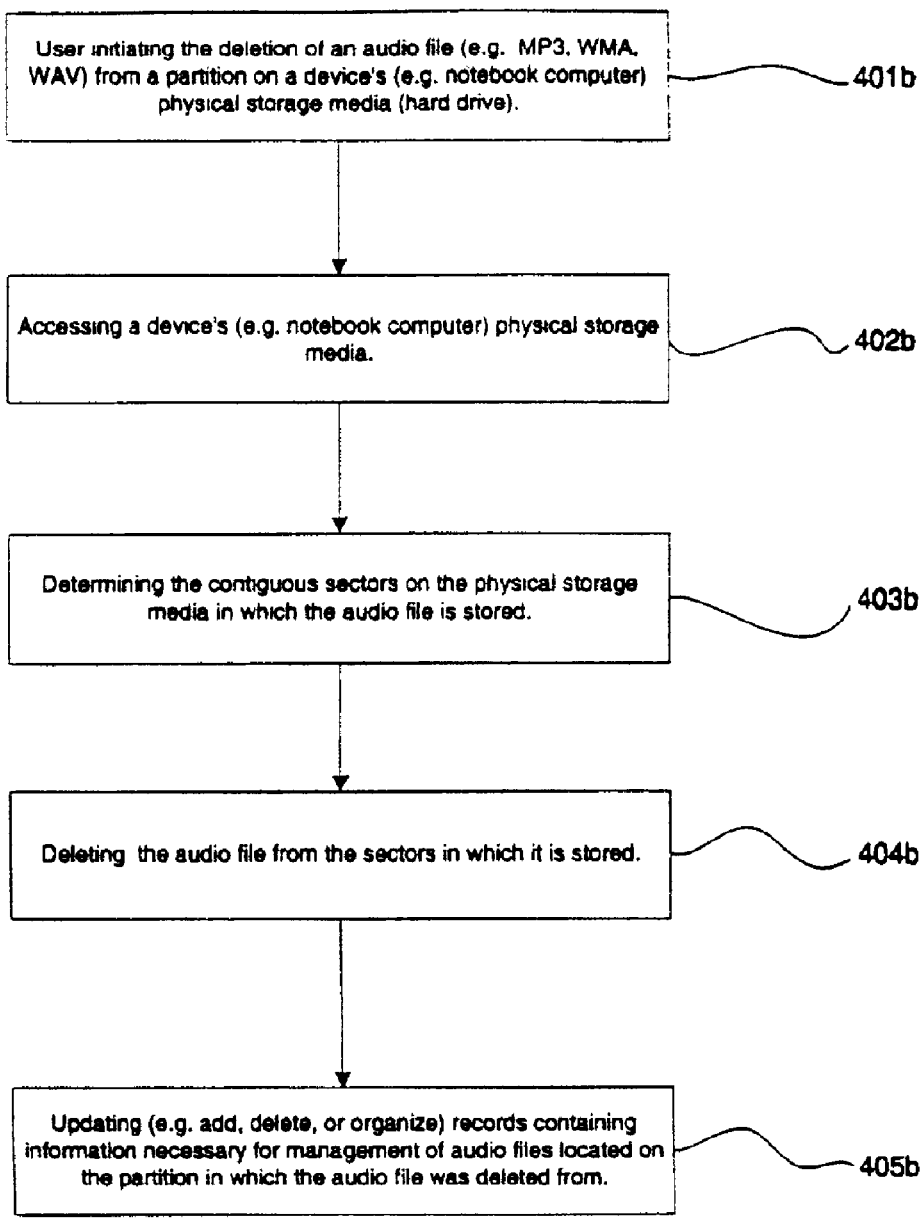
FIG. 4b illustrates an embodiment of a method of deleting audio files from a partition of a physical storage medium which is managed by an embodiment of the file system architecture disclosed.

In addition to playing audio files the file system architecture disclosed in one embodiment, provides a user with the ability to store and delete audio files on the partition of the physical storage medium which is managed by the file system architecture disclosed. FIG. 4a illustrates an embodiment of a method for storing audio files to a partition of a physical storage medium which is managed by the file system architecture disclosed. FIG. 4b illustrates an embodiment of a method for deleting audio files from a partition of a physical storage medium which is managed by the file system architecture disclosed.

Referring to FIGS. 1 and 4a, in one embodiment, first a user begins by initiating 401a the saving of an audio file to the partition of a device's 100 physical storage medium 103 which is managed by the file system architecture disclosed. After the user initiates the save request, the device's 100 processor will begin accessing 402a the device's 100 physical storage medium 103. The processor then locates 403a contiguous sectors on the physical storage medium 103 which are available to store the audio file. After locating available sectors, the processor will begin storing 404a the audio file in the contiguous sectors available. After storing the audio file, the processor is responsible for creating and updating 405a records containing information necessary for retrieval and management of the audio file.

The option of deleting audio files which are located on the partition of the physical storage medium managed by the file system architecture disclosed is also available. FIG. 4b illustrates an embodiment of a method for deleting audio files from a partition of the physical storage medium which is managed by the file system architecture.

Referring to FIGS. 1 and 4b, in one embodiment, first a user begins by initiating 401b the deletion of an audio file to the partition of a device's 100 physical storage medium 103 which is managed by the file system architecture. After the user initiates the deletion request, the device's 100 processor accesses 402b the device's 100 physical storage medium 103. The processor then locates 403b the contiguous sectors on the physical storage medium 103 in which the audio file is stored. After locating the audio file, the processor deletes 404b the audio file from the contiguous sectors in which it was stored. After deleting the audio file, the processor is responsible for updating 405b records containing information necessary for management of the remaining audio files on the partition from which the audio file was deleted.

Figure 5:
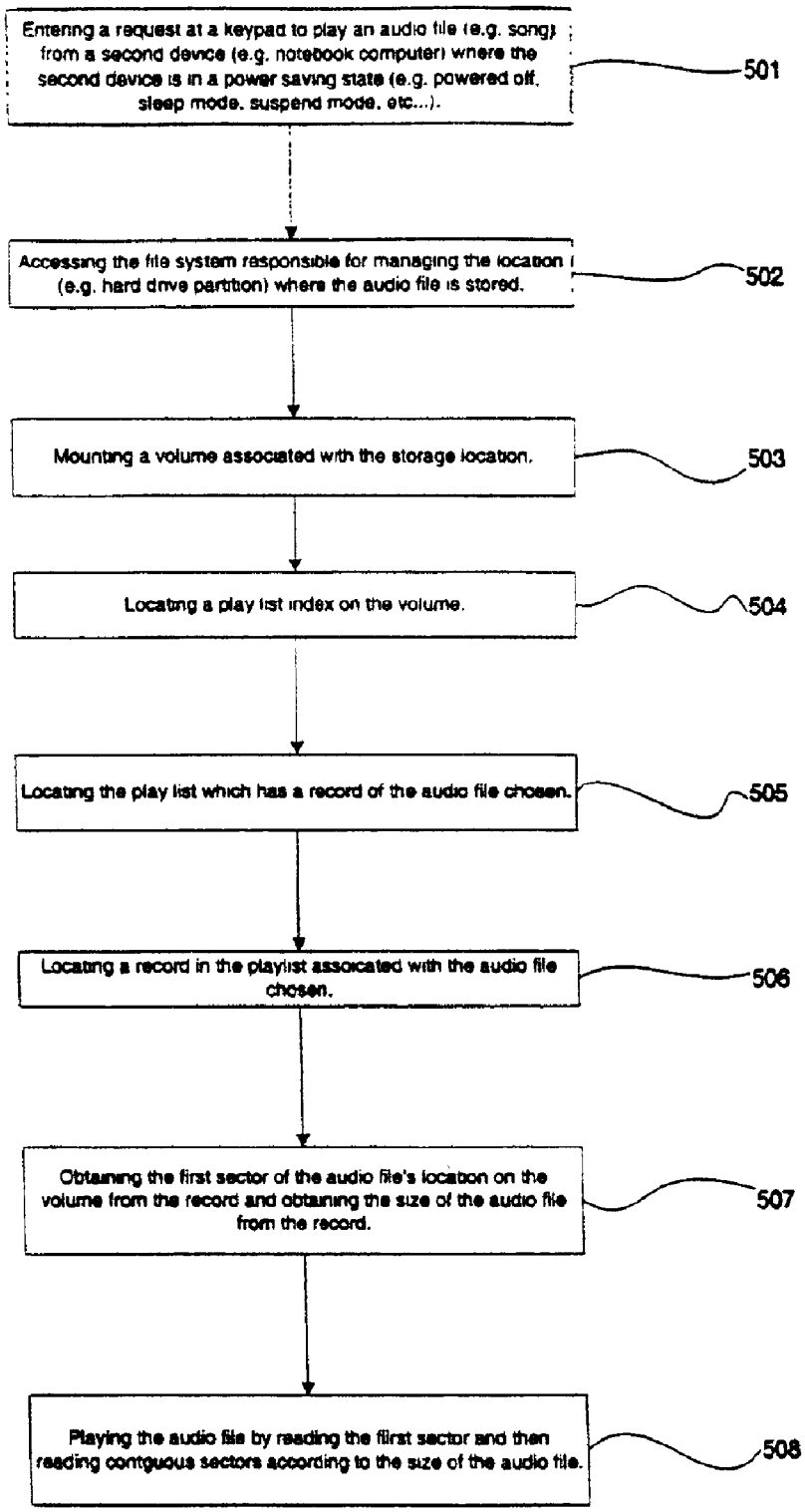
FIG. 5 illustrates an alternate embodiment of the method provided in FIG. 3.

Referring briefly back to FIG. 3, an embodiment of a method for playing audio files from a device (e.g. notebook computer) 100 in a power saving state, utilizing the file system architecture disclosed in combination with an audio device 101 was disclosed. Referring to FIG. 5, an alternate embodiment of the method provided in FIG. 3 is provided. Referring to FIGS. 1 and 5, the play process is initiated by a user entering 501 a request at a keypad to play an audio file (e.g. MP3, WMA, WAV) from a second device (e.g. notebook computer) where the second device is in a power saving state (e.g. powered off, sleep mode, suspend mode). The audio device processing the user request may play audio files from a computer's disk drive (e.g. CD-RW), a SmartMedia medium, or a computer's physical storage medium. The embodiment of the file system architecture disclosed is for playing and managing audio files on a device's (e.g. notebook computer or stand-alone jukebox) physical storage medium (e.g. hard drive). Referring to FIG. 2, in a stand-alone jukebox 200, the file system architecture resides on the jukebox hard drive 202. The audio device 201 communicates with the host by connecting to the host through a USB connection 203.

After receiving the user request, the audio device 201 accesses 502 the file system (e.g. the file system architecture disclosed) responsible for managing the location where the audio file is stored. The file system consists of a number of layers. The file system management layer is the lowest layer and the first layer contacted by the audio device. The file system management layer accesses the medium directly and supports basic functionality such as mounting, formatting, and dismounting the volume. The file system management layer mounts 503 the volume where the audio files managed by the file system architecture are stored.

On mounting the volume, the file system management layer reads sector 0 of the volume to determine if the volume is formatted. Sector 0 also contains pointers to other areas on the volume and during a mount or format the file system management layer calls the other layers to initialize their structures. Sector 0 of the volume mounted contains a record structure (e.g. BBFS_ROOT_RECORD) where relevant information for each separate layer is stored. Record structure 1 below illustrates one example of the record structure found at sector 0 of the volume mounted by the file system management layer.

Record Structure 1

```
struct BBFS_ROOT_RECORD {
    UInt32 Signature;
    UInt32 VolumeMapSector;
    UInt32 DirectorySector;
    UInt32 CurrentPlayListSector;
    UInt16 BytesPerSector;
    UInt8 SectorShift;
    UInt8 Checksum;
    UInt32 PlayIndexSector;
    UInt16 CurrentPlayListIndex;
    UInt16 PlayIndexIndex;
    UInt16 VolumeLabel[ ];
};
```

To assist in understanding the embodiment of the file system architecture disclosed, it is helpful to have an understanding of the fields listed in Record Structure 1. The Signature field of Record Structure 1 is read by the file system management layer to determine if the volume has been correctly formatted. For example, in one embodiment of the file system architecture disclosed, if the Signature field contains 0x53464242 then the volume has been correctly formatted.

Next to be examined, the VolumeMapSector field of Record Structure 1 points to the first sector of the volume map. During mounting of the volume the file system management layer reads the VolumeMapSector field and then sends this value to the layer (e.g. volume management layer) charged with keeping track of where files are located on the volume. It is important to note that when the volume is formatted, the volume management layer returns the first sector of the volume map back to the file system management layer so that the file system management layer can record that value into the VolumeMapSector field of Record Structure 1.

The DirectorySector field of Record Structure 1 follows the VolumeMapSector field in Record Structure 1. The DirectorySector field points to the first sector of the root directory of the volume. The File System Management layer reads the DirectorySector field and sends that value to the File Management layer during mounting of the volume. Similar to the VolumeMapSector described previously, when the volume is formatted, the File Management layer returns the first sector of the root directory back to the File System Management layer, so that the value can be recorded into the DirectorySector field of the record structure shown above in Record Structure 1.

Following the DirectorySector the CurrentPlayListSector field of Record Structure 1 is examined. The CurrentPlayListSector field points to the first sector of the current play list. Preferably, there should always be a current play list. If there are no songs inside a play list, it should still be a valid play list structure that contains 0 songs. Next, the BytesPerSector field of Record Structure 1 contains the number of bytes per sector.

After the BytesPerSector field the SectorShift field of Record Structure 1 is examined. The SectorShift field contains the shift value to convert logical sectors into physical sectors. Each sector is a 32-bit value, which means volumes can only contain 4,294,967,296 sectors (2048 GB with the default 512 bytes per sector). In the unlikely case that this value is too small, multiple physical sectors can be combined to form one logical sector. The Bytes PerSector field is preferably updated as well the default value for the SectorShift field is zero to indicate there is no shift required; i.e. a logical sector maps directly to a physical sector.

Next, the Checksum field of Record Structure 1 contains a logical checksum (addition of all the values) of all the fields before the Checksum field in the record provided in Record Structure 1. The checksum field is used by the File System Management layer in determining, if the volume has been formatted. If the checksum of the fields does not match the checksum in the Checksum field, the volume is considered unformatted or corrupted.

After the Checksum field the PlayIndexSector field of Record Structure 1 is examined. The PlayIndexSector field points to the first sector of the play list index. The play list index contains a list of all available play lists stored on the volume. Following the PlayIndexSector field, the record structure has a CurrentPlayListIndex field of Record Structure 1. The CurrentPlayListIndex field contains an index into the current play list of the song last accessed. In one embodiment, the audio device 101 and the operating system filter update this field whenever a song inside the current play list is accessed for play back. This allows for playing back from the same location after system shutdown and resume. Preferably, operating system filters are included for all major operating systems (e.g. DOS, Windows 95/98/ME, Windows 2000, Linux, etc . . . ). The operating system filters allow the host's operating system to access the partition managed by file system architecture disclosed as if the partition was a regular drive or volume which was not being managed by the file system architecture.

Next, the PlayIndexIndex field of Record Structure 1 is examined. The PlayIndexIndex field contains an index into the play list index. It describes the last play list accessed. In one embodiment, both the audio device 101 and the operating system file system filter update this field whenever a new play list is selected for play back. This allows the system to play back the last accessed play list after system shutdown and resume.

The next field in Record Structure 1 examined is the VolumeLabel field. The VolumeLabel field contains the label of the volume in 16-bit unicode characters, terminated by a hexadecimal zero (0x0000).

Returning to FIG. 5, after the volume has been mounted, the audio device 101 locates 504 a play list index on the volume. Each volume preferably should have at least one entry in its play list index: the global play list. The global play list is the default play list that contains all the songs stored in the volume. When the volume is mounted, the File System management layer calls the Play List management layer with the first sector of the play list index. The File System management layer receives this information from the PlayIndexSector field of Record Structure 1. The play list index itself is a contiguous number of sectors that holds a structure of records with information related to each play list available on the volume. In one embodiment, Record structure 2 below illustrates one example of the play list index record structure maintained by the play list management layer.

| Record Structure 2 |
| --- |
| struct BBFS_PLAY_INDEX { <br>     UInt32 Signature; <br>     UInt16 PlayIndexSize; <br>     UInt16 NumberOfEntries; <br>     PLAY_INDEX PlayIndex[ ]; <br> }; |

The Signature field of Record Structure 2 is read by the play list management layer to determine if the volume has been correctly formatted. For example, in one embodiment of the file system architecture disclosed, if the Signature field contains 0x58444E49 then the volume has been correctly formatted.

Also, Record Structure 2 includes a PlayIndexSize field. The PlayIndexSize field contains the number of sectors in the entire play list index. The Play List Management layer can cache the entire play list index in memory for speed. Following the PlayIndexSize field in Record Structure 2 is the NumberOfEntries field. The NumberOfEntries field contains the valid number of entries in the play list index.

Furthermore, a PlayIndex field is included in Record Structure 2. The PlayIndex field contains the entire play list index for the volume. The play list index is a simple array of structures known as PLAY_INDEX structures that describe the locations and attributes of each corresponding play list. In one embodiment, Record structure 3 below illustrates one example of a PLAY_INDEX structure.

| Record Structure 3 |
| --- |
| struct PLAY_INDEX { <br>     UInt32 PlayListSector; <br>     UInt32 FileRecordSector; <br> }; |

The PlayListSector field of Record Structure 3 contains the sector number of the play list structure for this entry in the play list index. The play list structure is described below and illustrated later in Record Structure 4.

Returning to Record Structure 3, the FileRecordSector field of Record Structure 3 contains the sector number of the file record structure that describes this entry in the play list index. If the FileRecordSector field is zero it does not point to a file record structure, but instead marks this play list index entry as the global play list (e.g. a list of all songs on the volume). The file record structure is an entry in a dual-linked list which is under the control of the File Management layer. The file record structure provides a record of information (e.g. size, name, sector, etc . . . ) related to each file on the volume. A more complete discussion of the file record structure is handled in a discussion of adding and deleting files from the volume below.

Referring back to FIG. 5, after locating a play list index in block 504 the next block provides for locating 505 the play list which has a record of the audio file chosen. As we learned with respect to Record Structure 3, the PlayListSector field contains the sector number of the play list structure for the current entry in the play list index. Record Structure 4 below illustrates one example of a play list structure (e.g. BBFS_PLAY_LIST)

| Record Structure 4 |
| --- |
| struct BBFS_PLAY_LIST{ <br>     UInt32 Signature; <br>     UInt16 PlayListSize; <br>     UInt16 NumberOfEntries; <br>     PLAY_LIST PlayList[ ]; <br> }; |

Similar to Record Structure 1 and Record Structure 2, Record Structure 4 has a Signature field. The Play List Management layer can use the Signature field of Record Structure 4 to determine if the volume has been correctly formatted. For example, in one embodiment of the file system architecture disclosed, if the Signature field of Record Structure 4 contains 0x59414C50 then the volume has been correctly formatted.

The next field of Record Structure 4 is the PlayListSize field. The PlayListSize field contains the number of sectors in the entire play list. The Play List Management layer can cache the entire play list in memory for speed. Following the PlayListSize field in Record Structure 4 is the NumberOfEntries fields. The NumberOfEntries field contains the valid number of entries in the play list. This value can be used by the audio device (e.g. Silicon Motion BlueBird VL) 101 firmware to play back songs randomly.

Returning to FIG. 5, after locating the play list the audio device locates 506 a record in the play list associated with the audio file chosen by the user. In order to locate the audio files record, the PlayList field in Record Structure 4 is checked. The PlayList field of Record Structure 4 contains the entire play list.

The play list is a simple array of structures (e.g. PLAY_LIST structures) that describe the type of the song and the location of its file record. In one embodiment, Record Structure 5 below illustrates one example of a play list structure (e.g. PLAY_LIST) included in the array of structures existing in the PlayList field of Record Structure 4.

| Record Structure 5 |
| --- |
| struct PLAY_LIST { <br>     UInt8 Type; <br>     UInt32 Sector; <br> }; |

The first of the two fields included in Record Structure 5 is the Type field. The Type field contains the type of the audio file for this entry in the play list. Table 1 below illustrates one example of the audio file types available in the file system architecture disclosed.

TABLE 1

| | |
| --- | --- |
| #define PLAY_LIST_UNUSED | 0 |
| #define PLAY_LIST_WAV | 1 |
| #define PLAY_LIST_MP3 | 2 |
| #define PLAY_LIST_WMA | 3 |

The first entry in Table 1 is the PLAY_LIST_UNUSED entry. The PLAY_LIST_UNUSED value marks an unused entry in the play list. This value is used at the end of the play list to mark unused entries until the end of the sector. The PLAY_LIST_WAV value marks the entry in the play list to be of a WAV type. The audio device 101 reads the WAV header and plays back the data inside the WAV file. The PLAY_LIST_MP3 value marks the entry in the play list to be of a MP3 type. The audio device 101 firmware decompresses and plays back the data inside the MP3 file. The PLAY_LIST_WMA value marks the entry in the play list to be of a WMA type. The audio device 101 firmware reads the WMA header, determines the codes, and plays back the data inside the WMA file. In alternate embodiments of the file system architecture additional audio file types (e.g. AAC) may be included.

According to FIG. 5, after locating a record in the play list the audio device 101 obtains 507 the first sector of the audio file's location on the volume from the record, and obtains the size of the audio file from the record. Both the location of the first sector of the audio file and the audio file's size are included in a file record structure controlled by the File Management layer. After obtaining the first sector and size of the audio file to be played from the file record structure, the audio device begins playing 508 the audio file by reading the first sector and then reading contiguous sectors according to the size of the audio file.

Returning to, Record Structure 5, in order to access the file record structure the sector field of Record Structure 5 is examined. The Sector field of Record Structure 5 contains the sector number of the file record structure for this entry in the play list.

The file record structure is an entry in la dual-linked list which is under the control of the File Management layer. The first entry of each dual-linked list that makes up a directory and its contents points to the parent directory. Each sub-directory entry points to the head of a new dual-linked list. During mounting of the volume, the File System Management layer calls the File Management layer with the first sector of the root directory of the volume. This sector contains the file record structure (e.g. BBFS_FILE_RECORD) included in the file system architecture disclosed. In one embodiment, Record structure 6 below illustrates one example of the file record structure maintained by the File Management layer.

| Record Structure 6 |
|---|
| struct BBFS_FILE_RECORD { <br>    UInt32 Signature; <br>    UInt32 PreviousSector; <br>    UInt32 NextSector; <br>    UInt32 Attributes; <br>    UInt16 Date; <br>    UInt16 Time; <br>    UInt32 Sector; <br>    UInt32 Size; <br>    UInt16 Name[ ]; <br> }; |

To assist in understanding some embodiments of the file system architecture disclosed, it is helpful to have an understanding of the fields listed in Record Structure 6. The Signature field of Record Structure 6 is used by the File Management layer to determine if the file record is correct. In one embodiment of the file system architecture disclosed, if the Signature field contains 0x454C4946, the file record is correct.

The next field in Record Structure 6 is the PreviousSector field. The PreviousSector field points to the previous sector in the dual-linked list that makes up a directory. If this file record is the head of the dual-linked list, it points to the last sector in the dual-linked list (i.e., it wraps around). Following the PreviousSector field in Record Structure 6 is the NextSector field. The NextSector field points to the next sector in the, dual-linked list that makes up a directory. If this file record is the tail of the dual-linked list, it points to the first sector in the dual-linked list (i.e., it wraps around).

The attributes field in Record Structure 6 describes the attributes of the file record. Table 2 below provides a list of bit definitions available to the attributes field of Record 6 in one embodiment of the file system architecture disclosed.

TABLE 2

| | |
|---|---|
| #define ATTRIBUTES_DIRECTORY | 0X0001 |
| #define ATTRIBUTES_READONLY | 0X0002 |
| #define ATTRIBUTES_MODIFIED | 0X0004 |
| #define ATTRIBUTES_PARENT | 0X0008 |
| #define ATTRIBUTES_HIDDEN | 0X0010 |
| #define ATTRIBUTES_SYSTEM | 0X0020 |

The ATTRIBUTES_DIRECTORY bit of Table 2 provides that the file entry is a sub-directory. The ATTRIBUTES_READONLY bit of Table 2 provides that the file entry is read-only, and cannot be written to, renamed, or deleted without clearing this bit first. The ATTRIBUTES_MODIFIED bit of Table 2 provides that the file entry has been modified. Any write access to any file will set this bit. A backup program can browse the directory entries and test this bit to see if the file has been changed since the last backup. The ATTRIBUTES_PARENT bit of Table 2 provides that the file entry is a pointer to the parent directory. This bit can only be set for the first entry in the dual-linked list that makes up a directory. The ATTRIBUTES_HIDDEN bit of Table 2 provides that the file entry is hidden. Hidden files are normally excluded from standard file searching. The ATTRIBUTES_SYSTEM bit of Table 2 provides that the file entry is a system level file. System level files are normally excluded from standard file searching and may have other protections.

Returning to Record Structure 6, following the Attributes field is the Date field. The Date field contains the date the file was last written to. It is packed into a 16-bit record (e.g. DATE) which is illustrated in Record Structure 7 below.

| Record Structure 7 |
|---|
| struct DATE { <br>    UInt16 Day:      5; <br>    UInt16 Month:   4; <br>    UInt16 Year:     7; <br> }; |

The Day field of Record Structure 7 holds the day of the date. The Month field of Record Structure 7 holds the month of the date. The Year field of Record Structure 7 holds the amount of years since 1980 of the date.

Returning to Record Structure 6, following the Date field is the Time field. The Time field contains the time the file this file record describes was last written to. It is packed into a 16-bit record (e.g. TIME) which is illustrated in Record Structure 8 below.

| Record Structure 8 |  |
|---|---|
| struct TIME { | |
| UInt16 BiSecond: | 5; |
| UInt16 Minute: | 6; |
| UInt16 Hour: | 5; |
| }; | |

The BiSecond field of Record Structure 8 holds the second of the time divided by two. The Minute field of Record Structure 8 holds the minute of the time. The Hour field of Record Structure 8 holds the hour of the time in 24-hour format.

Returning to Record Structure 6, following the Time field is the Sector field. The Sector field of Record Structure 6 contains the first sector of the data that belongs to the file this file record describes. If the ATTRIBUTES_PARENT attribute bit is set, it points to the head of the dual-linked list that describes the parent directory or 0 if this is the first entry of the root directory. After the Sector field is the Size field. The Size field of the Record Structure 6 contains the size of the file this record describes, where the size is provided in bytes. If the file record describes a directory, the Size field contains 0. The final field listed under Record Structure 6 is the Name field. The Name field holds the name of the file that this file record describes in 16-bit Unicode format, terminated by a hexadecimal zero (0X0000).

The previous discussion provided a detailed examination of playing an audio file from a partition of a physical storage medium which is managed by the file system architecture disclosed. Next, a detailed examination of adding files to the partition is provided. Referring briefly back to FIG. 4a, an embodiment of a method was provided for adding files to a partition of a physical storage medium which is managed by the file system architecture disclosed. An alternate embodiment of the method in FIG. 4a is provided in FIG. 6.

Figure 6:
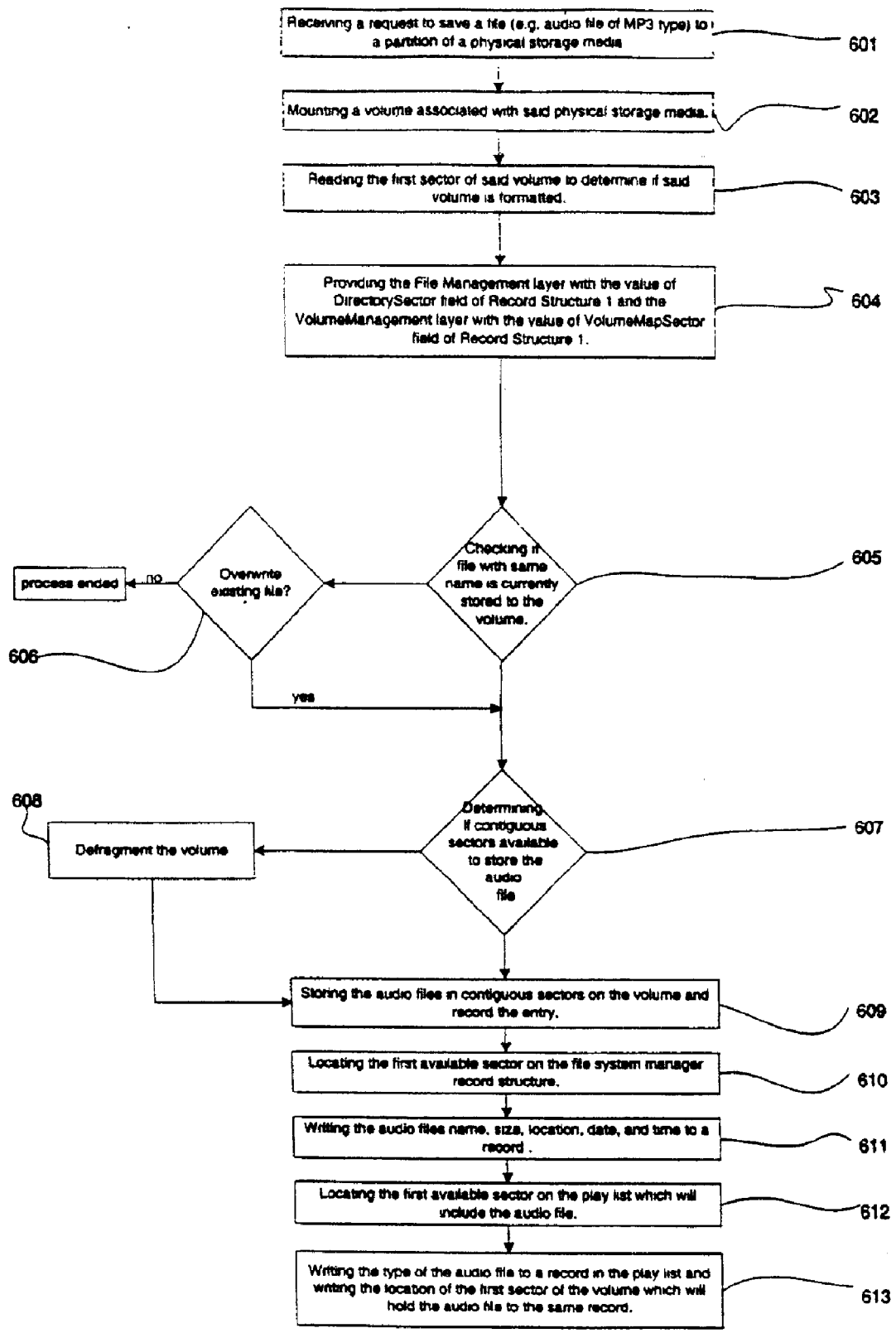

Referring to FIGS. 1 and 6, the computer's operating system receives 601 a request to save a file (e.g. audio file of MP3 type) to a partition of a physical storage medium (e.g. hard drive) which is managed by the file system architecture disclosed. The File System Management layer of the file system architecture disclosed mounts 602 the volume at which the file is to be stored. Next, the File System Management layer determines 603 if the volume is formatted. If the volume is formatted, the File System Management layer provides 604 the File Management layer with the DirectorySector field of Record Structure 1 and the VolumeManagement layer with the VolumeMapSector field of Record Structure 1. The host system's processor then caches the file record structure (e.g. BBFS_FILE_RECORD) controlled by the File Management layer into memory and checks 605 if the file the user, is attempting to save is listed. If the file is listed a request may be received to overwrite 606 the existing file. If a request to overwrite has been received, the file may be overwritten through retrieving the value of the Sector field of Record Structure 1 and writing the file to the volume beginning at the value retrieved. If the new file is larger than the older file, the Volume Management layer will have to defragment the volume to ensure that the file is stored in contiguous sectors. After the volume has been defragmented, the file to be written over the existing file will be written to contiguous sectors of the volume.

The Volume Management layer keeps track of where files are located on the volume, where the free space is located, and keeps the volume defragmented over time. It consists of a contiguous number of sectors that contain a dual-linked list with the status of each sector on the volume. During mounting of a volume, the File System layer calls the Volume Management layer with the first sector of the volume map, where this first sector contains a volume map structure (e.g. BBFS_VOLUME_MAP). In one embodiment, Record structure 9 below illustrates one example of the volume map structure maintained by the Volume Management layer of the file system architecture disclosed.

| Record Structure 9 |  |
|---|---|
| struct BBFS_VOLUME_MAP { | |
| UInt32 | Signature; |
| UInt16 | VolumeMapSize; |
| UInt16 | Reserved; |
| VOLUME_MAP Map[ ]; | |
| }; | |

The Signature field of Record Structure 9 is used by the Volume Management layer to determine if the Volume is properly formatted. For example, in one embodiment of the file system architecture disclosed, if the Signature field of Record Structure 9 contains 0x50414D56, then the volume has been correctly formatted. The VolumeMapSize field of Record Structure 9 contains the number of sectors in the entire volume map. The Volume Management layer can cache the entire volume map in memory for speed.

The Map field of Record Structure 9 contains the entire volume map for the volume. The volume map is a dual-linked list. Each entry in the list describes a range of sectors of the same type. In one embodiment, Record structure 10 below illustrates one example of the structure of the dual-linked list that exists in the Map field of Record Structure 9.

| Record Structure 10 |  |
|---|---|
| struct VOLUME_MAP { | |
| UInt32 | Allocation Type; |
| UInt16 | Previous; |
| UInt16 | Next; |
| UInt32 | Sector; |
| UInt32 | Size; |
| }; | |

The AllocationType field of Record Structure 10 describes the type of allocation in this dual-linked list entry. Table 3 below lists the definitions available for the AllocationType field of Record Structure 10.

TABLE 3

| #define ALLOCATION_UNUSED | 0X00000000 |
|---|---|
| #define ALLOCATION_FREE | 0X00000001 |
| #define ALLOCATION_USED | 0X00000002 |
| #define ALLOCATION_SYSTEM | 0X00000004 |

The ALLOCATION_UNUSED value provides that the entry in the dual-linked list is not in use (do not specify any sectors at all). All unused entries in the dual-linked list should be stored at the end of the list, so the Volume Management layer can have easy access to new entries if it needs to expand the volume map. The ALLOCATION_FREE bit provides that the entry in the dual-linked list describes a number of free sectors. The ALLOCATION_USED bit provides that the entry in the dual-linked list describes a number of used sectors.

The ALLOCATION_SYSTEM bit provides that the entry (combined with either ALLOCATION_FREE or ALLOCATION_USED) defines a system area. By default the system area is reserved for the volume map and directories and occupies 1/1000 of the volume size (e.g. 1 MB for a 1 GB volume). However, the system area can be expanded when it runs out,of space. Standard files will normally not be allocated in the system area unless the volume is running out of space. In this case, part of the system area is converted into user space. The Volume Management layer is responsible for keeping the system space and user space defragmented for best performance.

Referring back to Record Structure 10, the Previous field points to the previous entry in the dual-linked list. For the first entry in the dual-linked list it points to the last entry in the dual-linked list (i.e., it wraps around). The Next field of Record Structure 10 points to the next entry in the dual-linked list. For the last entry in the dual-linked list, it points to the first entry in the dual-linked list (i.e., it wraps around). The Sector field of Record Structure 10 contains the starting sector number of the range that this entry in the dual-linked list describes. The Size field of Record Structure 10 contains the number of sectors that this entry in the dual-linked list describes. All sectors in a particular entry in the dual-linked list have the same AllocationType.

Referring back to block 606 of FIG. 6, a determination of whether a file should be overwritten is made. Next, the Volume Management layer is examined. If there is not a copy of the file to be saved on the volume, then the Volume Management layer determines 607 if there are contiguous sectors available on the volume to store the file. The Volume Management layer defragments 608 the volume if necessary to make room. Next the Volume Management layer stores 609 the audio file to the volume and the record structures under the Volume Management layer's control.

The record structure of Record Structure 6 is updated to reflect the addition of a new file or overwriting of an existing file. When a new file is added to the volume, the File System Management layer locates 610 the first available sector on the File System Management layer record structure. Next, a new record is stored at that location. The file's name, size, location, date, and time are written 611 to the record.

After updating Record Structure 6 of the File System Management layer, the Play List which will list the file if it is an audio file is updated. If the file is a new file, free space is located 612 and a new play list record is added to the Record Structure 5 and Record Structure 4 is updated. Then the Play List record structures are updated 613.

The previous discussion provided a detailed examination of adding files to a partition of a physical storage medium which is managed by the file system architecture disclosed. Next, a detailed examination of deleting files from the partition is provided. Referring briefly back to FIG. 4*b*, an embodiment of a method was provided for deleting files from a partition of a physical storage medium managed by the file system architecture disclosed. An alternate embodiment of the method in FIG. 5*b* is provided in FIG. 7.

Figure 7:
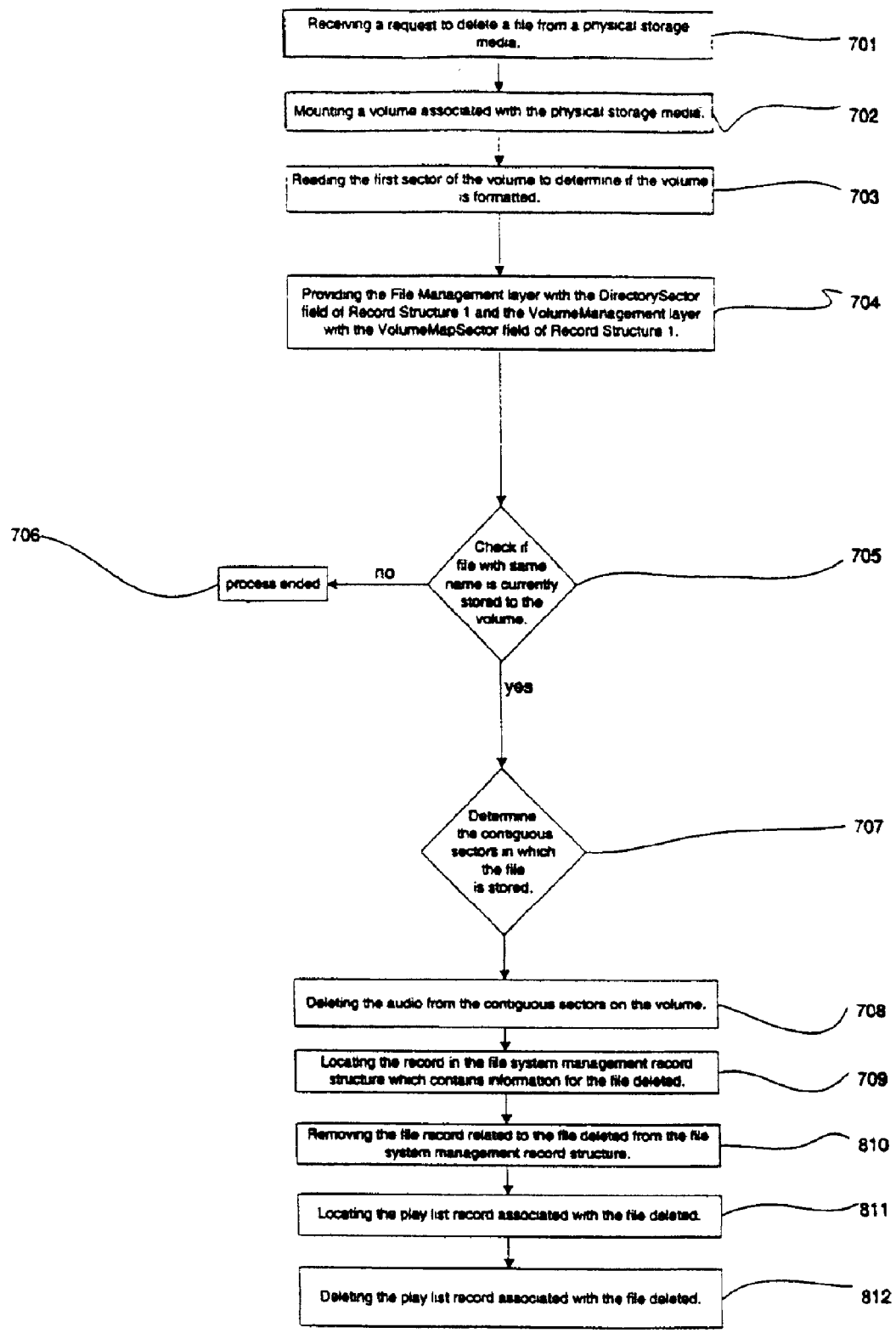
FIG. 7 illustrates an alternate embodiment more detailed embodiment of FIG. 4b.

Referring to FIGS. 1 and 7, the computer's operating system receives 701 a request to delete a file (e.g. audio file of MP3 type) from a partition of a physical storage medium (e.g. hard drive) which is managed by the file system architecture disclosed. The File System Management layer of the file system architecture disclosed mounts 702 the volume at which the file is located. Next, the File System Management layer determines 703 if the volume is formatted. If the volume is formatted, the File System Management layer provides 704 the File Management layer with the DirectorySector field of Record Structure 1 and the Volume-Management layer with the VolumeMapSector field of Record Structure 1. The host system's processor then caches the file record structure (e.g. BBFS_FILE_RECORD) controlled by the File Management layer into memory and checks 705 if the file the user is attempting to delete is listed. If the file is not listed the process terminates 706.

Referring back to block 705 of FIG. 7, a determination was made as to whether the file existed. Next, the Volume Management layer is examined. If the file is saved on the volume, then the Volume Management layer determines 707 the contiguous sectors at which the file is stored. Next the Volume Management layer deletes 708 the file (e.g. MP3) from the volume and removes the record associated with file from the record structures under the Volume Management layer's control.

The record structure of Record Structure 6 is updated to reflect the deletion of a file. When a file is deleted from a volume, the File System Management layer locates 709 the file's record in the File System Management layer record structure. Next, the file's record is removed 710 from the record structure.

After updating Record Structure 6 of the File System Management layer, the Play List which will list the file if it is an audio file is located 711. The Play List record structures is updated 712 to reflect the deletion of the file.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 3 may be integrated into components, or may be subdivided into components. Moreover, the blocks of FIG. 4*a* represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
   receiving a request at a primary device to play an audio file, where the primary device is in a power saving state;
   accessing a storage location on the primary device;
   locating a play list which has a record of the audio file;
   choosing the audio file from the play list; and
   playing the audio file, wherein the playing the audio file is performed while the primary device is in the power saving state.

2. A method as in claim 1 wherein the primary device is a notebook computer.

3. A method comprising:
   receiving a request at a primary device to play an audio file, where the primary device is in a power saving state;

accessing a storage location on the Primary device;
locating a play list which has a record of the audio file;
choosing the audio file from the play list;
playing the audio file; and
accessing the storage location after first determining that there is no disk drive, or no readable medium (e.g. CD-RW) attached to the primary device.

4. A method as in claim 3 wherein the storage location is a hard drive.

5. The method of claim 1 further comprising accessing the storage location manually in response to a user request.

6. A method as in claim 1 wherein accessing the storage location further comprises mounting a volume associated with the storage location.

7. A method as in claim 6 wherein mounting a volume further comprises a file system manager:
reading a first sector of the volume to determine if the volume is formatted;
locating a first sector of a volume map associated with the volume;
locating a first sector of a root directory of the volume;
locating an index to a list of available play lists located on the volume; and
locating a first sector of the play list index.

8. A method as in claim 7 further comprising the file system manager sending the first sector of the volume map to a volume manager.

9. A method as in claim 7 further comprising the file system manager sending the first sector of the root directory of the volume to a file manager.

10. A method as in claim 7 further comprising the file system manager sending the first sector of the play list index to a Play List manager.

11. The method of claim 1 further comprising locating the play list associated with the audio file which a user has requested to be played.

12. The method of claim 1 further comprising locating the record in the play list associated with the audio file chosen.

13. A method comprising:
receiving a request at a primary device to play an audio file, where the primary device is in a power saving state;
accessing a storage location on the primary device;
locating a play list which has a record of the audio file;
choosing the audio file from the play list;
playing the audio file;
locating the record in the play list associated with the audio file chosen; and
obtaining the first sector of the audio file's location and the size of the audio file from the record.

14. The method of claim 13 further comprising playing the audio file by reading the first sector of the audio file's location and then continuing to read contiguous sectors according to the size of the audio file.

15. A method comprising:
powering on a primary device;
choosing a file to save to a storage location on the device;
locating the storage location on the primary device;
locating a list of audio files which have been, saved to the storage location;
determining where to store the file;
writing the file to the storage location; and
writing information related to the file to a record, wherein the audio files are stored contiguously on the storage location.

16. A method as in claim 15 wherein the file is an audio file.

17. A method as in claim 16 wherein the file is an MP3 file.

18. A method as in claim 16 wherein the file is a WAV file.

19. A method as in claim 15 wherein locating a list of the audio files comprises determining where the audio file should be listed.

20. The method of claim 15 wherein a user may create multiple lists by selecting audio files and storing them in separate lists.

21. A method as in claim 15 wherein a record is created providing information necessary to access the audio file.

22. A method as in claim 15 wherein the device is a notebook computer.

23. An apparatus comprising:
a file system management logic block for a physical storage location;
a volume management logic block for the physical storage location;
a file management logic block for the physical storage location; and
a song play list management logic block for the physical storage location,
wherein the song play list management logic block is controllable at least by a microcontroller.

24. An apparatus as in claim 23 wherein the file system management logic block to mount and dismount the physical storage location.

25. An apparatus as in claim 23 wherein the file system management logic block to format the physical storage location.

26. An apparatus as in claim 23 wherein the file system management logic block to control access to the physical storage location.

27. An apparatus as in claim 23 wherein the file system management logic block to access a record comprised of relevant information for each separate logic block.

28. An apparatus as in claim 27 wherein the record is located on sector 0 of the physical storage location.

29. An apparatus as in claim 23 wherein the volume management logic block contains a dual-linked list which contains the status of each sector on the volume.

30. An apparatus as in claim 23 wherein the file management logic block is responsible for file and directory management.

31. An apparatus as in claim 30 wherein the directory is a dual-linked list of file entries, each in their own sector.

32. An apparatus as in claim 31 wherein the dual-linked list contains a record of each file and each directory located on the physical storage location.

33. An apparatus as in claim 23 wherein the Play List management logic block tracks all the playable songs and corresponding play lists on the physical storage location.

34. An apparatus as in claim 33 wherein the Play List management logic block contains a play list index.

35. An apparatus as in claim 34 wherein the play list index is a structure containing a list of play lists for the entire physical storage location.

36. An apparatus as in claim 35 wherein a play list is a contiguous number of sectors that holds a play list structure wherein the play list structure contains the type of audio files in the play list and the location of the audio files in the play list.

37. A machine readable medium having embodied thereon a program for execution by a machine, the program comprising:

a first code block segment for mounting and dismounting a volume;

a second code block for keeping track of where files are located on the volume;

a third code block for managing files and directories on the volume; and a fourth code block for managing and organizing a play list or multiple play lists on a volume, wherein a play list is a list of audio files accessible at least by a microcontroller.

38. A machine readable medium as in claim 37 further comprising the first code block to send the first sector of the volume map to the second code block.

39. A machine readable medium as in claim 37 further comprising the first code block to send the first sector of the root directory of the volume to third code block.

40. A machine readable medium as in claim 37 further comprising the first code block to send the first sector of the play list index to the fourth code block.

41. A machine readable medium as in claim 37 wherein the Play List is a List of audio files.

42. A machine readable medium as in claim 37 further comprising the fourth code block locating the play list associated with the audio file which the user has requested to be played.

43. A machine readable medium as in claim 37 further comprising the fourth code block locating a record in the play list, where the record is associated with the audio file chosen.

44. A machine readable medium as in claim 43 further comprising the fourth code block obtaining the first sector of the audio file's location and the size of the audio file from the record.

45. A machine readable medium as in claim 37 further comprising the third code block playing the audio file by reading the first sector of the audio file's location and then continuing to read contiguous sectors according to the size of the audio file.

46. A machine readable medium as in claim 37 further comprising the third code block storing or removing files from the volume.

* * * * *